United States Patent [19]

Swarovski

[11] 4,235,951
[45] Nov. 25, 1980

[54] GLASS MIRROR FILM, AND METHODS FOR ITS PRODUCTION AND USE

[75] Inventor: Daniel Swarovski, Wattens, Austria

[73] Assignee: D. Swarovski & Co., Glasschleiferei, Tirol, Austria

[21] Appl. No.: 804,317

[22] Filed: Jun. 7, 1977

[30] Foreign Application Priority Data

Jun. 10, 1976 [DE]  Fed. Rep. of Germany ....... 2626039
Oct. 7, 1976 [DE]  Fed. Rep. of Germany ....... 2645371

[51] Int. Cl.² ............................................. B32B 17/06
[52] U.S. Cl. ...................................... 428/40; 428/202;
428/203; 428/209; 428/210; 428/211; 428/336;
428/344; 428/354; 428/913; 428/426; 428/432
[58] Field of Search ....................... 428/40, 41, 42, 49,
428/138, 336, 313, 344, 352, 354, 202, 203, 918,
211, 209, 210, 906, 913; 156/101, 253, 278, 280,
297, 304, 309, 71; 350/163, 164, 165; 52/390,
309.13, 304.14; 126/270, 211

[56] References Cited

U.S. PATENT DOCUMENTS

| | | | |
|---|---|---|---|
| 1,214,863 | 2/1917 | Woeste | 428/49 |
| 1,382,261 | 6/1921 | Abeley | 156/155 |
| 2,383,884 | 8/1945 | Palmquist | 428/432 |
| 2,707,903 | 5/1955 | Trombe | 350/292 |
| 3,152,950 | 10/1964 | Palmquist et al. | 428/335 |
| 3,186,813 | 6/1965 | Pfaender | 65/90 |
| 3,541,825 | 11/1970 | Reader et al. | 350/320 |
| 3,622,298 | 11/1971 | Machlan | 65/91 |
| 3,681,179 | 8/1972 | Theissen | 428/338 |
| 3,716,432 | 2/1973 | Morrison | 428/41 |
| 3,753,841 | 8/1973 | Wheeler | 428/40 |
| 3,925,584 | 12/1975 | Suzuki et al. | 428/344 |
| 3,936,567 | 2/1976 | Vesely | 428/40 |
| 3,959,056 | 5/1976 | Caplan | 156/197 |
| 4,035,065 | 7/1977 | Argoud et al. | 350/310 |
| 4,095,013 | 6/1978 | Burger | 428/335 |

FOREIGN PATENT DOCUMENTS

| | | |
|---|---|---|
| 1191766 | 2/1966 | Fed. Rep. of Germany . |
| 2152642 | 4/1973 | Fed. Rep. of Germany . |
| 2255268 | 5/1974 | Fed. Rep. of Germany . |
| 1216153 | 4/1960 | France . |
| 468803 | 7/1937 | United Kingdom ...................... 428/49 |

*Primary Examiner*—Stanley S. Silverman
*Attorney, Agent, or Firm*—Neuman, Williams, Anderson & Olson

[57] ABSTRACT

A glass mirror film of layered construction is provided. The glass mirror film comprises a pliable glass film having a supporting film secured to one surface by an adhesive layer and a reflective layer disposed on an opposed glass film surface. A gummed layer may be applied over the reflective surface if desired. The glass mirror films are particularly suitable for use in concentrating solar collectors.

12 Claims, 3 Drawing Figures

GLASS MIRROR FILM, AND METHODS FOR ITS PRODUCTION AND USE

Reflective plastic films are well-known in the art. Films of this type, however, possess significant disadvantages when employed in certain applications. The temperature and weather resistance of such films in particular are not satisfactory. Reflecting properties deteriorate considerably during the process of use, and heretofore reflective plastic films have proved unsuitable for use in applications such as use in concentrating solar collectors.

Also, known in the prior art is the production of glass plates of minute thickness. Thin glass plates are employed in the production, for example, of cover glasses for microscopic optics. A serious disadvantage of these thin glass plates is that they are easily broken. This high risk of breakage is precisely the reason that these thin glass plates cannot be handled and used in other fields.

It is an object of this invention to devise a glass mirror film of high flexibility, which can be used in many applications with minimum breakage or damage.

In accordance with this invention the disadvantages attendant the prior art use of plastic films as reflectors and attendant the prior art use of thin glass plates are avoided. Such avoidance is effected by employing a novel, layered pliable glass film sandwich which includes a flexible support sheet for such film and means for securing such glass film in a desired position of use.

Thus, it is an object of this invention to provide a sturdy, mirrored, glass film construction having reflecting properties and wear characteristics superior to those of plastic reflective films known in the art while also possessing excellent strength properties.

It is a further object of this invention to provide a mirrored film construction particularly adapted for use in solar collectors and having superior wear characteristics.

The above and other objects of this invention will become apparent from the following detailed description when read in the light of the accompanying drawing and appended claims.

In one embodiment of this invention a thin glass mirror film is provided comprising a thin glass film having a reflective layer disposed on one surface thereof; a supporting pliable sheet such as a plastic or paper sheet or the like is detachably secured to the nonreflecting glass film surface. A deformable gummed layer may be applied over the reflective surface to facilitate securing the glass film in a position of use. Other optional layers comprise a protective coating of a varnish or the like interposed the reflective layer and gummed layer to protect such reflective coating, and a releasable protective covering for the outermost surface of the gummed layer.

At the time of use the protective and supporting films are stripped from the opposed outer surfaces of the layered assembly and the remaining layers secured in place by the gummed layer. As an alternative to using the gummed layer, plastic film coated with adhesive on opposed surfaces may function to secure the glass film to a mounting surface as will be hereinafter described.

For a complete understanding of this invention reference will now be made to the accompanying drawings, in which.

Figure 1:
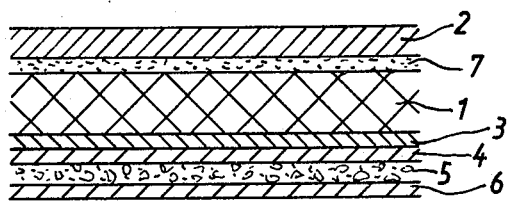
FIG. 1 is a fragmentary sectional view of one embodiment of a glass mirror film made in accordance with this invention.

Referring now to FIG. 1 a layered mirror film made in accordance with this invention is fragmentarily illustrated in section. Glass film 1 illustrated in the sandwich of FIG. 1 is produced in a known manner. The thin pliable glass film 1 is usually formed by drawing the same from molten glass. The glass films employed in the layered sandwiches of this invention must be sufficiently thin so as to be pliable. Theoretically, the thickness of the glass film has no minimum limit. It can, for example, merely amount to a few $\mu$m. It is, however, difficult to produce very thin glass films. The thickness of the glass films used is therefore determined by economic criteria. Glass films of a thickness of about 0.1 to 1 mm are suitable. A thickness of 0.1 to 0.5 mm is preferably. In this regard also the quality of the glass must be taken into consideration as elasticity and flexibility of the glass is dependent on its constitution. It is also preferable to use weather-resistant glass for purposes of this invention.

Glass film 1 is connected with supporting film 2 by means of an adhesive layer 7. Supporting film 2 consists of suitable pliable film material, in particular plastic material, for example polyethylene or polypropylene, or paper. The essential function of supporting film 2 is to provide the fragile glass film 1 with the necessary stability in further processing, handling and use. A supporting film 2 of paper is preferable if adhesive layer 5 consists of adhesive adapted to be heat activated.

Adhesive layer 7 illustrated in FIG. 1 may consist of any suitable material causing adhesion between supporting film 2 and glass film 1. The connection between the supporting film and the glass film should, however, be detachable. Adhesive layer 7 is applied to supporting film 2 preferably as a self-adhesive layer, so that the supporting film 2, after removing an optional protective film (not illustrated) attached to the self-adhesive layer, may readily be connected with glass film 1 by means of layer 7.

Glass film 1 secured to supporting film 2 subsequently is provided with a reflective layer 3. The application of reflective layers of this type is well-known in the art. Suitable embodiments entail the application of a silver layer in a known manner, or the coating by evaporation of aluminum in a high vacuum. As an alternative, the glass film may be provided with a reflective metal film as a substitute for the conventional mirror coating.

Reflective layer 3 may, if desired, be provided with a protective layer 4, which is usually a varnish coating.

Subsequently a gummed layer 5 is applied to protective layer 4 or, if no layer 4 is employed directly to reflective layer 3. Gummed layer 5 serves to connect the glass mirror film, depending on its use, with a particular substratum or the surface of the object to be covered. The choice of adhesive for gummed layer 5 is determined by the substratum to which the glass mirror film is to be applied. Any known adhesives may be used. Gummed layer 5 may be self-adhesive, or may be activated by heat or in any other manner. Gummed layer 5 preferably consists of elastic adhesive. Examples for adhesives are arcylic resins, epoxy resins, silicone rubber and asphalt. A film coated with adhesive on both sides may be substituted for gummed layer 5.

When using self-adhesive material in gummed layer 5, usually a protective film of siliconized paper or the like is provided. Such protective film, such as film 6 of the drawings, is removed before applying the glass mirror film in place to a substratum in the normal course of glass film use.

The glass mirror film embodiment of the invention illustrated in FIG. 1, has excellent reflecting properties and is therefore preferable to the use of plastic films for the reasons above given.

Figure 2:
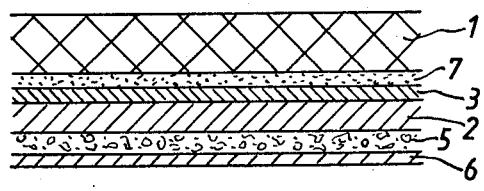
FIG. 2 is a view similar to FIG. 1 of a further embodiment of a glass mirror film made in accordance with this invention.

An alternative embodiment of a glass mirror film made in accordance with this invention is illustrated in FIG. 2.

In the production of the embodiment of FIG. 2 a pliable glass film 1 is connected with a supporting film 2 by means of an interposed adhesive layer 7. Film 2 has a reflective layer 3 on the side facing glass film 1, and on the other side a gummed layer 5, with a protective film 6, if desired, to prevent exposure of the layer 5.

Supporting film 2 preferably comprises a plastic film, for example, a polyethylene flm. On one side film 2 is provided in a manner known in the art with a very thin metal layer, preferably aluminum which comprises layer 3. Application of the metal layer is effected in high vacuum. The thickness of the metal layer generally is below 1 μm. The opposed or bottom side of supporting film 2 is provided with a gummed layer 5 as described above. Gummed layer 5 may be provided with a protective film 6. In an alternative construction layer 5 may be replaced by a film (not illustrated) for example of plastic material, with adhesive on both sides. It is also possible to apply gummed layer 5 to supporting film 2 subsequent to engagement of glass film 1 with supporting film 2.

Adhesive layer 7 comprises a suitable material which ensures a secure engagement between glass film 1 and the metal used in reflective layer 3. The adhesive of adhesive layer 7 is preferably applied in fluid form to the glass film 1, and/or the supporting film 2 provided with reflective layer 3. Layer 7 is allowed to harden by means of suitable processing steps, such as addition of heat or radiation. Adhesive layer 7 may, however, be provided on reflective layer 3. Suitable materials for adhesive layer 7 are, by way of example, solvent-free acrylic resins, epoxy resins and silicone adhesives.

The glass mirror films according to the invention are suitable for various applications. The effect of the connection of the thin glass film with a supporting film is that breakage or damage of the complete film during transport and use is obviated.

Use applications for the mirror films of this invention comprise all fields where conventional glass mirrors or reflective plastic films have heretofore been used. Glass mirror films according to this invention may, as an example, be used as conventional mirrors, as traffic mirrors and in optical instruments.

The glass mirror films above described are, however, particularly suitable for use in concentrating solar collectors. Concentrating solar collectors, for example, in the shape of parabolic-cylinder mirrors, are attaining increasing importance due to the energy shortage.

The manufacture of solar collectors of metallized plastic material is known in the art. These solar collectors, however, have poor reflective values. In addition, their reflecting power in the course of time decreases considerably due to environmental indluences.

The lining of solar collectors with mirror-coated glass is also known. The use of mirror-coated glass has resulted in good reflection values, however, a number of serious disadvantages are encountered with such mirror-coated glass.

Production of parabolically curved glass plates, which are employed to line trough-like solar collectors, is difficult and therefore not economical. The mirror-coating of the curved glass troughs or tubs is complicated, cannot be carried out continuously, and thus results in high production costs. The parabolic curvature of the glass plates must be effected by means of thermic deformation. The trough-like glass collectors due to their given shape cannot be stacked, are difficult to transport and are fragile, breaking very easily. Since solar collectors are of considerable size and are turnable, the weight of these known glass mirrors also has a negative effect.

The foregoing disadvantages may be completely eliminated by using glass mirror films of this invention to line solar collectors. The glass mirror films of this invention may be transported easily and without risk of breakage in a planar condition. The reduction in weight is considerable. Production is extremely economical, since little material is used and, the mirror-coating can be carried out continuously on the planar glass film. The glass mirror films may be applied at the site of use to, for example, trough-like solar collectors. This can be done without thermic treatment of the glass film due to the film pliability. The fact that the glass mirror films are connected with the collector trough by means of adhesive ensures the absence of voids between the trough support surface and the glass film in which corrosion may occur. The impact strength of the provided films which is of importance during hail storms and similar occasions when the glass film surface is struck, is superior to that of thick glass troughs. Compared with plastic films, glass mirror films have superior weather resistance, superior resistance to scratching and attendant reduced reflection, as well as superior cleanability characteristics.

Figure 3:
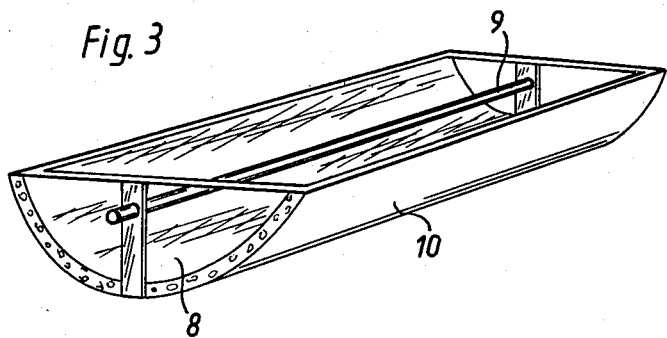
FIG. 3 is a perspective view of a solar collector lined with a glass mirror film made in accordance with this invention.

A concentrating solar collector lined with a glass mirror film according to the invention is illustrated in FIG. 3. The body of solar collector trough 10, as an example, may comprise plastic material (polyester resins, reinforced with glass fibers if required, polyurethane and the like), weather-resistant asbestos cement, concrete, metal or other suitable material. The trough may be ribbed to increase its strength and suitable fastening means may form a part of the trough. The design of trough-like solar collectors which may, for example, have a size of 1.8 m$^2$ and their use is known. The drawing schematically illustrates heat exchange tube 9 through which a heat conducting medium may flow.

Solar collector trough 10 can easily be lined with pliable glass mirror films 8 made pursuant to the invention. The thickness of the glass film 1 is chosen so as to enable the glass mirror film 8 to be curved according to the curvature of the trough support surface. In case of a shallow curvature, thicker glass films may be used. The glass mirror film, after removal of the optional protective film 6 attached to the gummed layer 5, is placed into the solar collector trough and connected with it. Melt adhesive, if used, is activated by heat. The use of elastic adhesive is preferable, since it improves the impact strength and, in addition, forms an elastic padding which is capable of absorbing stress resulting from the varying coefficients of expansion of the materials making up the mirror film. Suitable adhesives are, for example, silicone rubber, asphalt and epoxy resins.

It is possible to line a solar collector trough 10 with a continuous glass mirror film 8. It is, however, preferable to line it with individual strips of glass mirror film 8 arranged longitudinally along the trough. When using a plurality of individual strips as a lining, glass mirror films of little pliability, i.e., thicker glass films, may be used. An additional advantage in subdividing the glass mirror film into individual strips is that in case of improper handling of a single strip, damage to the whole trough lining is avoided and only a single strip is subjected to damage. The individual strips are preferably jointed with silicone rubber or other suitable materials.

The solar collector employing the glass mirror film of FIG. 1 is arranged in layers as follows: solar collector trough 10; gummed layer 5; protective layer 4, if desired; reflective layer 3 and glass film 1. The supporting film 2, with adhesive layer 7, is removed after or when placing the glass mirror film into the trough 10. The gummed layer 5, if required, can be provided on the support surface of the solar collector trough instead of on the glass mirror film. When using the embodiment shown by FIG. 2, the layer arrangement is as follows: solar collector trough 10; gummed layer 5; supporting film 2; reflective layer 3; adhesive layer 7; and glass film 1.

It is obvious that the application of the glass mirror films according to the invention is not restricted to parabolic-cylinder mirrors; circular parabolic mirrors, for example, can also be lined with such films. In this cse, for example, segmentation of the glass film into portions of the shape of a trapezoid or the sector of a circle is possible.

In case of glass mirror films with a large surface area and a strong or steep curvature, detachment of the reflective layer 3 from the glass film 1 is to be feared due to the possible slight adhesion between such reflective layer and the glass film.

Detachment may, however, be prevented if the reflective layer 3 according to a preferred embodiment is subdivided, i.e., applied in a discontinuous manner to the glass film 1. The result of a subdivision of the reflective layer is that the reflective layer, even on large curved surfaces, does not detach itself from the glass film 1. In the small areas where no reflective layer is provided, the adhesive comes into direct contact with the glass film. In this way a firm connection between glass film 1 and a substratum is ensured. The reduction or reflection values because of the minute areas that are not covered with a reflective layer is negligible.

The reflective layer 3 may be subdivided in any desired manner. The reflective areas may, for example, be arranged side-by-side in the shape of rectangles or squares. The size of the reflective areas is mainly determined by the given adhesion of the reflective 3 layer to the glass film 1, the stress the film is subject to and the curvature of the film. In case of poor adhesion of the reflective layer 3 to the glass film 1, strong stress and a strong curvature, a subdivision into small segments is to be made. Suitable dimensions for rectangular or square areas covered with a reflective layer range between 0.5 and 25 cm, particularly between 2 and 10 cm. The reflective areas may also consist of optional geometric shapes other than the rectangular shapes. The shapes to be taken into consideration are, in particular, hexagons arranged side-by-side (honeycomb pattern) as well as segments of the shape of a trapezoid or the sector of a circle, the latter in particular, if the glass mirror films are to be used for circular parabolic mirrors.

The space between the individual segments covered with the reflective layer may be very small. It must, however, be certain that the individual areas are isolated. The space may therefore be of only a few μm. It is, however, preferable to provide for a larger space, so that sufficient adhesive is in direct contact with the glass film 1. Therefore, in particular a space of about 0.05 to 2 mm and preferably 0.1 to 1 mm is to be considered. In case of large reflective areas being chosen, it is advisable to also provide for larger spaces.

Application of the reflective layer is discontinuous areas may be carried out in different ways. Selection of the suitable method is primarily determined by the method used to apply the reflective layer 3 and by the width of the passages arranged between the reflective areas.

When applying the reflective layer 3 in high vacuum it is preferable to use a cover grating, which is placed on the glass film. In that case only those areas of the glass film, which are not covered by the cover grating, are covered with the reflective layer.

When applying a reflective layer 3, for example a silver layer in a wet process, it is preferable to apply a parting compound to the glass film in the passage areas. This may be done, for example, by means of screen printing or cylinder printing. As an alternative, a grating of suitable adhesive material may be applied.

In case of wide passages it is furthermore possible to apply self-adhesive bands as passages.

A further possibility consists in at first applying the reflective layer 3 continuously and removing the passage areas subsequently. This may be done mechanically, for example by means of scratching or by way of chemical agents. In the latter case a covering varnish is applied to the continuous reflective layer 3 in such a manner that the passages remain free. This, for example, may again be done by means of screen printing or cylinder printing. Subsequently, the reflective layer is removed in the passage areas. A continuous covering layer may then be applied as a means of completion.

It is believed that the foregoing description has suggested a number of modifications to the structures and processes of this invention to those skilled in the art which are within the broad ambit of the invention disclosed. Accordingly, this invention is to be limited only by the scope of the appended claims.

What is claimed is:

1. A glass mirror film composite comprising a thin, pliable, glass film, a reflective layer disposed on one side of said pliable glass film for substantially completely reflecting light striking the same and a flexible supporting film releasably adhesively secured to a side of said pliable glass film.

2. The glass mirror film of claim 1 in which said reflective layer and said supporting film are disposed on opposite sides of said pliable glass film.

3. The glass mirror film of claim 1 in which said reflective layer, support film and adhesive layer are disposed on one side of said pliable glass film; said reflective layer being interposed said adhesive layer and said support film.

4. The glass mirror film of claim 1 in which a gummed layer is applied over said reflective layer.

5. The glass mirror film of claim 4 in which said gummed layer has a detachable protective film applied thereover.

6. The glass mirror film of claim 4 in which said gummed layer comprises an elastic adhesive.

7. The glass mirror film of claim 1 in which a film coated with adhesive on both sides is applied over said reflective layer.

8. The glass mirror film of claim 1 in which said pliable glass film has a thickness of less than about 1 mm.

9. The glass mirror film of claim 1 in which said supporting film is a member of the group consisting of plastic and paper sheets.

10. The glass mirror film of claim 1 in which said reflective layer is discontinuous.

11. A glass mirror film adapted to conform to a curved supporting surface comprising a thin, pliable, glass film; a reflective layer disposed on one side of said pliable glass film for substantially completely reflecting light striking the same, an adhesive layer disposed on said reflective layer and a flexible supporting film releasably adhesively secured to a side of said pliable glass film.

12. The glass mirror film of claim 1 in which a protective layer for said reflective layer is applied thereon.

* * * * *